Figure 1:
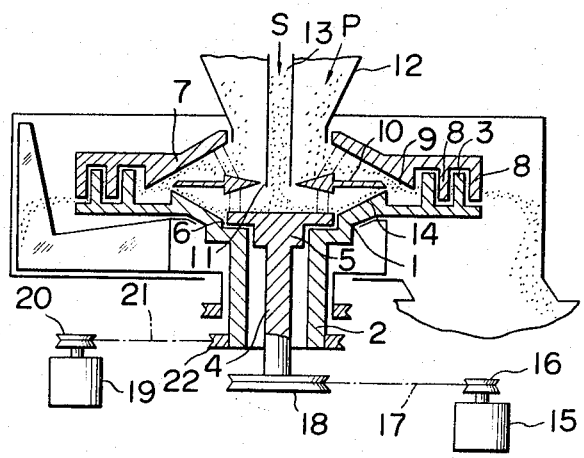

March 7, 1967  HIDEO OIKAWA  3,308,171
METHOD FOR PRODUCING GRANULAR OR POWDERY SORBITOL FROM
SORBITOL SOLUTION
Filed May 19, 1965

Hideo Oikawa
INVENTOR

BY George P. Oujevolk
Attorney

3,308,171
METHOD FOR PRODUCING GRANULAR OR POWDERY SORBITOL FROM SORBITOL SOLUTION
Hideo Oikawa, Yokohama-shi, Japan, assignor to Yokohama Seito Kabushiki Kaisha, Yokohama, Japan, a company of Japan
Filed May 19, 1965, Ser. No. 457,132
Claims priority, application Japan, July 17, 1964, 39/40,123
1 Claim. (Cl. 260—637)

This invention relates to an improved method for obtaining sorbitol, as solid or powder, from its solution.

Sorbitol presently on the market is generally in the state of 70 percent aqueous solution, solid or powder.

One of the conventional methods of obtaining sorbitol, as solid or powder, from its solution comprises the steps of adding crystal seed to a thick solution of sorbitol, agitating the solution with the crystal seed, then transferring the agitated solution into little vessels after it has assumed a massecuite state, leaving or dry heating the massecuite within the vessels to solidify the sorbitol into solid state and crushing or grinding the sorbitol into granules or powder.

Another method resorted to in certain cases comprises introducing the sugar to become the seed into a rotating apparatus such as a rotary drier, or scattering a powdered sorbitol with air blast force, blowing against the sorbitol a concentrated solution of sorbitol by means of a nozzle sprayer, and granulating and drying the resulting matter by utilizing the rotation of the rotating apparatus, thereby to produce granular sorbitol.

In the former method, however, more than ten hours are needed for the sorbitol to become thoroughly solid so as to make possible the subsequent crushing or grinding operation thereof even if the sorbitol solution is prepared in high purity state, and more than twenty hours are needed in the case of sorbitol solution of low purity. Moreover, the former method is disadvantageous in that much labor and space are required for the transportation and accumulation of the vessels, and a great amount of power is needed for the crushing or grinding operation.

In the case of the second above described method, while solidification of the sorbitol solution can be carried out continuously and in a relatively short time, uniform scattering of the powdered sorbitol cannot be achieved in the rotary drier, for obvious reasons, even with air blast force, because of differences in the particle size and apparent specific gravity. Furthermore, in the spraying process, the blow back from the spray nozzle causes the sorbitol solution to drip, or the solid sorbitol particles to adhere to the nozzle, whereby the diameters of the liquid drops increase.

Furthermore, large lumps of wet sorbitol are often formed since the sorbitol solution and powder are successively fed onto the granular sorbitol formed within the rotary dryer shell. The crushing or grinding operation of such large wet lumps by a mechanical crusher or grinder is usually difficult because of the sticking character of the lumps, and therefore must be manually carried out. This is an extremely labor-consuming job. In addition to these disadvantages, a large amount of wet mixture of the solution and powder adheres to the inside wall of the dryer shell due to the non-uniformity of intermixing of the powder and solution. Moreover, non-uniformity of intermixing may possibly produce solid sorbitol internally containing sorbitol solution.

In order to prevent these disadvantageous occurrences, the ratio of amount of the sorbitol solution to that of the sorbitol powder must necessarily be reduced to a reasonable degree. Accordingly, the mixture ratio is limited to from 20 to 25 percent in terms of solid component proportion relative to the mixture. These naturally result in reduced rate of the solid sorbitol to be finally obtained.

This invention aims to provide an improved method affording uniformly dispersed intermixing of the sorbitol solution and powdery cores, so as to overcome the above-mentioned disadvantages of the conventional methods.

This invention further aims to provide an improved method of obtaining solid sorbitol in which a high and constant production rate of solid sorbitol is attained by a simple operation and the subsequent crushing or grinding operation is easy, and in which solid sorbitol is continuously produced in a shorter time.

According to this invention, a heated thick sorbitol solution and sorbitol powder serving as the seed are separately prepared. Then, centrifugal force is applied to the heated thick solution to radially throw the latter in a state of extending dispersed filmy flow, and at the same time centrifugal force is also applied to the sorbitol powder thrown into the latter in a state of radially extending dispersed filmy flow. The sorbitol solution and powder are centrifugally thrown in a manner that their filmy flows intersect each other at an angle, so that a completely uniform and continuous intermixing operation therebetween is ensured. And, at the same time, a cooled or heated gas for imparting solidification effect to sorbitol solution is blown into the solidifying vessel thereby carrying out solidification of sorbitol solution into granular or particulate form.

It has been found that a concentration between 70 and 94% (Brix) and a temperature between 60 and 100° C. are preferable for the heated thick sorbitol solution.

In the above operation, cooled or heated air may be supplied to the intermixing area for the solution and powder, according to the purity.

Alternatively, the intermixing area may be situated at an upper portion of a drying chamber which is being supplied with heated or cooled air, as in the case of spray driers.

Figure 2:
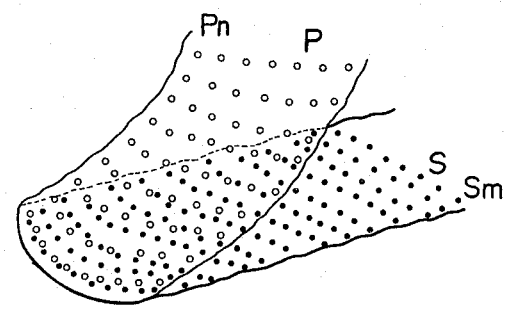

The nature, principle, and details of the invention will be more clearly apparent by reference to the following description taken in conjunction with the accompanying drawing in which:

FIG. 1 is an elevational view, in vertical section, schematically showing the essential construction and arrangement of an apparatus suitable for use in the practice of the method according to the invention; and FIG. 2 is a perspective view indicating the fundamental principle of the invention.

When the method of this invention is used to mix two substances P and S in the mixture proportion of $Pn$ and $Sm$, as shown in FIG. 2, the substances are respectively dispersed and spread out with uniform distributions in accordance with the proportions $Pn$ and $Sm$ to form two thin layer streams of the substances which continuously merge in a superimposed manner. Various kinds of mixing apparatus for accomplishing the above described mixing may be considered, but the simplest mechanism capable of carrying out highly stable mixing is the instantaneous mixer as shown in FIG. 1.

Referring to FIG. 1, the apparatus for carrying out the method of the invention comprises a lower dish-shaped disc 1 adapted to be continuously rotated about a vertical axis. The lower disc 1 has integral therewith a hollow vertical shaft 2 extending downwardly therefrom and connected to a power source (not shown). The lower disc 1 also has on the peripheral portion thereof dispersing teeth 3 projecting upwardly.

Through the hollow shaft 2 extends a vertical shaft 4 connected to a power source (not shown) and carrying on the top thereof an intermediate rotatable disc 5. This intermediate disc 5 is located in a circular recess 6 of the lower disc 1.

An uppermost rotatable disc 7 is located above the lower disc 1. The disc 7 has on the peripheral portion thereof dispersing teeth 8 similar to the teeth 3. The teeth 3 and 8 alternately project between each other to form dispersing means. The uppermost disc 7 has a frusto-conical portion 9 forming an inlet for materials to be treated.

Between the uppermost and lower discs 7 and 1 there is provided a horizontally extending upper dish-like disc 10 which is located directly above the intermediate disc 5. The upper disc 10 has a central opening 11 therethrough.

The intermediate, upper and uppermost discs 5, 10 and 7 are so associated as to rotate in the same direction as an integral mass.

The inlet of the uppermost disc 7 has a supply funnel 12. Through this funnel 12 there is provided a supply chute 13 extending vertically to the central opening 11 through the disc 10.

In operation of the apparatus, the four discs 1, 5, 7 and 10 are rotated at high speed, and the heated thick sorbitol solution and the sorbitol powder are introduced into the apparatus through the supply chute 13 and the supply funnel 12, respectively. The sorbitol powder thus supplied is continuously directed onto the upper disc 10 and thrown radially along the upper surface of the disc by centrifugal force exerted thereon, as soon as it reaches the rotating disc 10. The powder, as it is thrown by the disc, is dispersed into a radially extending filmy flow and then flows against the inner wall of the frusto-conical portion 9 of the uppermost disc 7 to be guided therealong radially downwardly.

The heated sorbitol solution supplied through the chute 13 is directed through the central opening 11 through the upper disc 10 onto the underlying intermediate disc 5. The solution, as soon as it reaches the rotating disc 5, is thereby thrown radially outwardly as a radially extending filmy flow. This filmy flow then passes radially upwardly along the inner wall of an inverted frusto-conical portion 14 of the lower disc 1 under the influence of centrifugal force exerted by the disc 1. The radially upwardly advancing filmy flow of the solution, just after leaving the inner wall of the portion 14 of the disc 1, is caused to intersect the radially downwardly advancing filmy flow of the powder. This causes a perfectly uniform intermixing action between the solution and powder and, in order that fine grains of wet sorbitol product formed by mixing and adhering the sorbitol powder and solution may not mutually adhere to coagulate and that size distribution of the granular product may be uniformly fine, it is necessary to introduce a gas having a solidification effect into the solidifying vessel simultaneously with mixing and adhering of the sorbitol solution and powder.

In order to obtain satisfactory result by using the apparatus as above described, the operating condition must be carefully considered such as temperature, concentration, viscosity and rate of supply of the sorbitol solution and/or powder. In addition, the speed of rotation of the discs, and the shape and size of the teeth should also be considered.

It has been found by experiments that the preferable value of concentration of the sorbitol solution is between 70 and 94% (Brix) and that of temperature of the solution is between 60 and 100° C. The experiments further indicated that it is preferable that the peripheral teeth of the discs be of the rhombic or circular shape, and the pitch of the teeth be three or four times the width thereof. It has been found further effect Z of the rotating discs should be between 80 and 600 Z for the uppermost disc 7 (at the outermost periphery of the frusto-conical inner wall of the disc 7) and between 60 and 600 Z for the lower disc 1 (at the outermost periphery of the inverted frusto-conical inner wall of the disc 1).

Below 70% (Brix) concentration of the solution, effective solidificating of solid sorbitol may not be obtained because of low saturation of the solution, with the result that the finally obtained solid sorbitol remains wet. This necessitates additional heat for subsequent drying operation. On the other hand, above 94% (Brix) concentration of the solution, due to the high saturation of a great amount of power will additionally be needed for the shearing of the sorbitol solution. Furthermore, sorbitol solid may contain the solution therein because the outer portion thereof will tend to become solid prematurely. This fact also makes the subsequent grinding operation difficult.

Below 60° C. the viscosity of the thick sorbitol solution will increase, thus making uniform solidification more difficult and above 100° C. a problem arises with regard to the melting point of sorbitol powder.

Practically, the invention may be carried out as shown in the following example.

EXAMPLE 1

Powder of higher sorbitol containing 0.8% moisture was introduced through the supply funnel into the apparatus at a rate of 690 grams per minute, and a solution of sorbitol having substantially the same composition as the sorbitol serving as the seed and a concentration of 88% and heated to 85° C. was introduced through the supply chute into the apparatus at a rate of 400 milliliters per minute. At the same time, hot air heated to 85° C. was supplied into the apparatus. The centrifugal effect Z was 100 at the outermost periphery of the frusto-conical inner wall of the uppermost disc 7 and 150 at the outermost periphery of the inverted frusto-conical inner wall of of the lower disc 1.

Under these conditions, the product discharged from the apparatus was in almost dried state containing granular and powdery sorbitol. This almost dried product was thereafter caused to pass through a rotary dryer and a rotary cooler in order to additionally dry the product.

The final product so obtained was of the character as indicated in Table 1.

*Table 1*

| | |
|---|---|
| Mixing rate _____percent__ | 43 |
| Moisture content _____do____ | 0.75 |
| Size of particles, mesh: | |
|     Above 5 _____percent by weight__ | 1.10 |
|     5 x 10 _____do____ | 32.3 |
|     10 x 20 _____do____ | 34.3 |
|     20 x 40 _____do____ | 10.8 |
|     Below 40 _____do____ | 11.7 |

EXAMPLE 2

Powder of lower sorbitol containing 0.8% moisture was introduced through the supply funnel into the apparatus at a rate of 1000 grams per minute, and a lower sorbitol solution having a concentration of 90% and heated to 90° C. was introduced through the supply chute into the apparatus at a rate of 520 milliliters per minute. The centrifugal effect Z was 300 at the outermost periphery of the frusto-conical inner wall of the uppermost disc 7, and 300 at the outermost periphery of the inverted frusto-conical inner wall of the lower disc 1. The product delivered from the apparatus was subjected to the action of a rotary dryer and a rotary cooler in order to additionally dry the product.

The resulting final product was of a character indicated in Table 2.

*Table 2*

| | |
|---|---|
| Mixing rate _____percent__ | 40 |
| Moisture content _____do____ | 0.78 |
| Size of particles, mesh: | |
|     Above 5 _____percent by weight__ | 7.5 |
|     5 x 10 _____do____ | 25.0 |
|     10 x 20 _____do____ | 36.1 |
|     20 x 40 _____do____ | 11.3 |
|     Below 40 _____do____ | 20.1 |

As illustrated in the examples, the final product obtained by the process according to the invention does not contain any liquid therein and may be directly subjected to subsequent grinding operation. The size of the particles to be finally obtained may be changed according to the rate of supply of the solution and powder, the speed of rotation of the discs, the concentration and temperature of the solution, the drying temperature, and so on.

According to the invention, the intersection or crossing of the dispersed filmy flows of the solution and powder ensures a complete and uniform intermixing between the solution and powder. Furthermore, the dispersed filmy condition of the solution and powder makes possible instant contact of the dispersed independent particles thereof, which prevents creation of enlarged aggregated masses of solid sorbitol while permitting the creation of granular or powdery sorbitol of relatively uniform size.

The sorbitol powder used as seed may ordinarily be the final product obtained by the invention.

What I claim is:

A method for continuously producing granular sorbitol which comprises steps of: introducing sorbitol powder as seed onto a first surface rotating at high speed in a substantially horizontal plane so that said powder is projected radially outward under the action of centrifugal force forming a continuous and uniform thin layer on said first surface, said thin layer moving over the periphery of said rotating first surface in a defined first plane onto a second surface rotating coaxially with said first surface; introducing a sorbitol liquid solution of between about 70% to about 94% Brix heated to between about 60° C. to about 100° C. onto a third surface rotating at high speed in a plane substantially parallel to and coaxial with said first surface so as to render said liquid solution into a thin film under the action of centrifugal force, said thin film moving radially outward and over the periphery of said rotating third surface onto said rotating second surface defining a second plane, said second defined plane of liquid thin film from said rotating third surface intersecting said first defined plane of said powder thin layer from said first surface so that mixing of said thin film and thin layer takes place on said second surface, said liquid and powder adhering together as mixed particles; and projecting said mixed phase particles over the periphery of said rotating second surface by the action of centrifugal force in the presence of air so as to solidify said mixed phase particles.

References Cited by the Examiner

UNITED STATES PATENTS

| | | | |
|---|---|---|---|
| 2,483,254 | 9/1949 | Almy _____ | 260—637 X |
| 2,641,453 | 6/1953 | Teale _____ | 259—8 |
| 3,051,454 | 8/1962 | Goos et al. _____ | 259—6 |

LEON ZITVER, *Primary Examiner.*

G. A. MILWICK, J. E. EVANS, *Assistant Examiners.*